United States Patent
Tanaka et al.

(10) Patent No.: US 10,899,328 B2
(45) Date of Patent: Jan. 26, 2021

(54) BRAKING CONTROL DEVICE FOR VEHICLE

(71) Applicant: ADVICS CO., LTD., Kariya (JP)

(72) Inventors: Manabu Tanaka, Obu (JP); Shunya Watanabe, Kariya (JP)

(73) Assignee: ADVICS CO., LTD., Kariya (JP)

( * ) Notice: Subject to any disclaimer, the term of this patent is extended or adjusted under 35 U.S.C. 154(b) by 206 days.

(21) Appl. No.: 16/090,760

(22) PCT Filed: Apr. 7, 2017

(86) PCT No.: PCT/JP2017/014434
§ 371 (c)(1),
(2) Date: Oct. 2, 2018

(87) PCT Pub. No.: WO2017/175846
PCT Pub. Date: Oct. 12, 2017

(65) Prior Publication Data
US 2020/0130656 A1    Apr. 30, 2020

(30) Foreign Application Priority Data
Apr. 8, 2016 (JP) .................................. 2016-077821

(51) Int. Cl.
*B60T 8/172* (2006.01)
*H02P 6/28* (2016.01)
(Continued)

(52) U.S. Cl.
CPC ............... *B60T 8/172* (2013.01); *B60T 8/17* (2013.01); *B60T 8/4022* (2013.01); *B60T 8/48* (2013.01); *H02P 6/08* (2013.01); *H02P 6/28* (2016.02)

(58) Field of Classification Search
CPC .......... B60T 8/172; B60T 8/4022; B60T 8/48; B60T 8/17; H02P 6/28; H02P 6/08
See application file for complete search history.

(56) References Cited

U.S. PATENT DOCUMENTS

2011/0246039 A1* 10/2011 Takeda ................... F16D 65/18
701/70
2014/0163831 A1* 6/2014 Kodama ................. F16D 13/54
701/68

(Continued)

FOREIGN PATENT DOCUMENTS

JP          11152026 A    6/1999
JP       2011213201 A   10/2011
(Continued)

OTHER PUBLICATIONS

International Search Report (with English Translation) and Written Opinion issued in International Patent Application No. PCT/JP2017/014434, 7 pages (dated Jul. 11, 2017).

*Primary Examiner* — Sze-Hon Kong
(74) *Attorney, Agent, or Firm* — Buchanan Ingersoll & Rooney PC (57) ABSTRACT

A braking control device comprising: an operation amount acquisition device that obtains an operation amount for a braking operation member; a pressurizing unit that presses a friction member to a rotating member fixed to a wheel, by using an electric motor; a control that controls the output of the motor based on the operation amount; a pressing force acquisition device that obtains the actual pressing force of the friction member pressing on the rotating member; and a rotation angle acquisition device that obtains the actual rotation angle of the motor. The control: stores the correlation between the actual pressing force and the actual rotation angle; approximates a function map indicated by a second degree or higher polynomial based on the correlation; calculates a target rotation angle based on the operation amount and the function map; and controls the motor such that the actual rotation angle matches the target rotation angle.

5 Claims, 4 Drawing Sheets

(51) Int. Cl.
*B60T 8/40* (2006.01)
*H02P 6/08* (2016.01)
*B60T 8/48* (2006.01)
*B60T 8/17* (2006.01)

(56) References Cited

U.S. PATENT DOCUMENTS

| | | | |
|---|---|---|---|
| 2015/0081186 A1* | 3/2015 | Yasui | B60T 13/741 |
| | | | 701/70 |
| 2016/0001752 A1 | 1/2016 | Yasui et al. | |
| 2017/0009834 A1* | 1/2017 | Masuda | F16D 66/021 |
| 2017/0072931 A1* | 3/2017 | Masuda | B60T 8/00 |
| 2017/0108067 A1* | 4/2017 | Masuda | F16D 55/226 |
| 2018/0009426 A1* | 1/2018 | Masuda | B60T 13/746 |
| 2018/0079403 A1* | 3/2018 | Masuda | B60T 13/74 |

FOREIGN PATENT DOCUMENTS

| | | |
|---|---|---|
| JP | 2014177207 A | 9/2014 |
| JP | 2015160607 A | 9/2015 |

* cited by examiner

BRAKING CONTROL DEVICE FOR VEHICLE

TECHNICAL FIELD

The present invention relates to a braking control device for a vehicle.

BACKGROUND ART

Patent Literature 1 describes "even in a case where a rigidity table TO stored by a RAM 31 upon starting a braking operation and an actual rigidity characteristic of an electric caliper 4 (a position-specific pushing force characteristic), which changes according to a braking circumstance such as braking intervals and braking durations, do not match, a pushing force instruction value and rotating position-specific characteristic (rigidity table) are updated each time a thrusting force estimation value is calculated in one braking" for a purpose of "providing an electric brake device capable of ensuring a braking force in accordance with an operation amount of a brake pedal". It describes that as a result, "a deviation between the pushing force instruction value and an actual pushing force can be reduced, which is in other words, followability to a pressing force instruction can be ensured according to an actual state of rigidity characteristic of the electric caliper 4".

Further, Patent Literature 1 describes that "a current-thrusting force conversion process unit 45 calculates an estimated thrusting force value being information on a thrusting force from a corrected current outputted from a current correction process unit 43. Calculation of the estimated thrusting force value by the current-thrusting force conversion process unit 45 is performed based on a motor torque constant and a mechanical efficiency of the caliper 4 obtained in advance by measurement. A thrusting force information calculation means is implemented with this current-thrusting force conversion process unit 45. The calculated estimated thrusting force value is outputted from the current-thrusting force conversion process unit 45 to a rigidity table update unit 46 and a pushing force instruction-motor rotating position instruction conversion process unit 37. The rigidity table update unit 46 generates an update rigidity table as described later using the estimated thrusting force value being the information on the thrusting force obtained by the current-thrusting force conversion process unit 45 and a corrected motor rotating position obtained by the current correction process unit 43, at a timing when the estimated thrusting force value is calculated, and changes the rigidity table being rigidity characteristic data stored in the RAM 31 to the update rigidity table". That is, the device described in Patent Literature 1 calculates a pushing force (which is also termed pressing force) is calculated based on the current.

The applicant is engaged in development of a device which performs direct detection and control instead of acquiring the pressing force (for example, a wheel cylinder fluid pressure) by estimation as described in Patent Literature 2. In order to improve controllability in a range where the pressing force is extremely low, a highly precise rigidity table (a relationship between a rotation angle of an electric motor and the pressing force, which is also called a calculation map) is necessary even in a braking control device that directly detects the pressing force. The detected pressing force is affected by noise and the like, and a creation of a highly precise rigidity table in which the above is compensated is desired.

CITATIONS LIST

Patent Literature

Patent Literature 1: JP 2011-213201 A
Patent Literature 2: JP 2015-160607 A

SUMMARY OF INVENTION

Technical Problems

An object of the present invention is to provide a braking control device configured to directly detect a pressing force, in which precision of a calculation map is improved based on a relationship of a rotation angle of an electric motor and the pressing force.

Solutions to Problems

A braking control device for a vehicle according to the present invention includes: an operation amount acquisition means (BPA) configured to obtain an operation amount (Bpa) of a braking operation member (BP) operated by a driver of the vehicle; a pressurizing unit (KAU) configured to press a friction member (MSB) against a rotating member (KTB) fixed to a wheel (WH) of the vehicle by using an electric motor (MTR); and a control means (CTL) configured to control an output of the electric motor (MTR) based on the operation amount (Bpa). Further, the braking control device includes a pressing force acquisition means (FPA) configured to acquire an actual pressing force (Fpa) of the friction member (MSB) pressing against the rotating member (KTB); and a rotation angle acquisition means (MKA) that acquires an actual rotation angle (Mka) of the electric motor (MTR).

In the braking control device for a vehicle according to the present invention, the control means (CTL) is configured to: store a correlation between the actual pressing force (Fpa) and the actual rotation angle (Mka); approximate a function map (CMkt) expressed by a second or higher degree polynomial (Knj) based on the correlation; calculate a target rotation angle (Mkt) based on the operation amount (Bpa) and the function map (CMkt); and control the electric motor (MTR) such that the actual rotation angle (Mka) matches the target rotation angle (Mkt).

According to the above configuration, control precision in a small-operation range in which a change in the actual pressing force (actual pressing force) Fpa is small relative to a change in the braking operation amount Bpa is improved, and an influence of a sensor noise can be compensated without using a filter with a low-passing band.

In the braking control device for a vehicle according to the present invention, the pressing force acquisition means (FPA) may be configured to acquire the actual pressing force (Fpa) through an analog-digital conversion process (ADH). In a case where an analog sensor is employed as the pressing force acquisition means FPA, the actual pressing force Fpa is affected by an LSB (resolution of a detection signal) in an analog-digital conversion process (AD conversion process). Specifically, the actual pressing force Fpa that has been subjected to the AD conversion process exhibits step-wise signal values (detection values). However, since the approximation function is employed as the calculation map CMkt, the step-wise signal values are interpolated, and the influence of the LSB can be compensated.

DESCRIPTION OF EMBODIMENTS

<Overall Configuration of Braking Control Device for Vehicle according to the Present Invention>

A braking control device BCS according to the present invention will be described with reference to an overall configuration diagram of FIG. 1. In the following description, members, calculation processes, and signals given a same sign exhibit a same function, and overlapping explanations therefor may be omitted.

In a vehicle provided with the braking control device BCS, a braking operation member BP, an operation amount acquisition means BPA, a control means CTL, a master cylinder MCL, a stroke simulator SSM, a simulator cutoff valve VSM, a pressurizing unit KAU, a switch valve VKR, a master cylinder pipe HMC, a wheel cylinder pipe HWC, and a pressurizing cylinder pipe HKC are provided. Further, each wheel WH is provided with a brake caliper CRP, a wheel cylinder WC, a rotating member KTB, and friction members MSB.

The braking operation member (for example, a brake pedal) BP is a member which a driver operates to decelerate the vehicle. When the braking operation member BP is operated, brake torque of the wheel WH is adjusted, and a braking force is generated in each wheel WH. Specifically, the wheel WH of the vehicle has the rotating member (for example, a brake disk) KTB fixed thereto. The brake caliper CRP is arranged to interpose the rotating member KTB therebetween. Further, the brake caliper CRP is provided with the wheel cylinder WC. A pressure of braking fluid in the wheel cylinder WC is increased, by which the friction members (for example, brake pads) MSB are pressed against the rotating member KTB. The rotating member KTB and the wheel WH are fixed via a fixation shaft DSF, and a frictional force generated thereupon generates the brake torque (braking force) in the wheel WH.

The operation amount acquisition means (operation amount sensor) BPA is provided in the braking operation member BP. An operation amount (braking operation amount) Bpa of the braking operation member BP by the driver is acquired (detected) by the operation amount acquisition means BPA. Specifically, as the operation amount acquisition means BPA, at least one of a fluid pressure sensor configured to detect a pressure in the master cylinder MCL, an operational displacement sensor configured to detect an operational displacement of the braking operation member BP, and an operational force sensor configured to detect an operational force on the braking operation member BP is employed. That is, the operation amount acquisition means BPA is a collective term for the master cylinder fluid pressure sensor, the operational displacement sensor, and the operational force sensor. Thus, the braking operation amount Bpa is determined based on at least one of a fluid pressure of the master cylinder MCL, an operational displacement of the braking operation member BP, and an operational force of the braking operation member BP. The operation amount Bpa is inputted to the control means CTL.

The control means (which is also termed a controller) CTL is configured of an electric circuit board on which a microprocessor and the like are implemented, and a control algorithm programmed in the microprocessor. The control means CTL is configured to control the pressurizing unit KAU, the cutoff valve VSM, and the switch valve VKR to be described later based on the braking operation amount Bpa. Specifically, signals for controlling the electric motor MTR, the cutoff valve VSM, and the switch valve VKR are calculated based on the programmed control algorithm, and are outputted from the control means CTL.

When the operation amount Bpa becomes equal to or greater than a predetermined value bp0, the control means CTL outputs a drive signal Vsm for setting the cutoff valve VSM to an open position and also outputs a drive signal Vkr for the switch valve VKR to bring the pressurizing cylinder pipe HKC and the wheel cylinder pipe HWC to a communicated state. In this case, the master cylinder MCL is set in a communicated state with the simulator SSM, and the pressurizing cylinder KCL is set in a communicated state with the wheel cylinder WC.

The control means CTL calculates drive signals (Su1, etc.) for driving the electric motor MTR based on the operation amount Bpa, a rotation angle Mka, and a pressing force Fpa, and outputs the same to a driving circuit DRV. Here, the braking operation amount Bpa is detected by the braking operation amount acquisition means BPA, the actual rotation angle Mka is detected by the rotation angle acquisition means MKA, and the actual pressing force Fpa is detected by the pressing force acquisition means FPA. The pressure in the braking fluid in the wheel cylinder WC is controlled (maintained, increased, or decreased) by the pressurizing unit KAU driven by the electric motor MTR.

The master cylinder MCL is connected to the braking operation member BP via a piston rod PRD. The operational force (brake pedaling force) of the braking operation member BP is converted to the pressure of the braking fluid by the master cylinder MCL. The master cylinder pipe HMC is connected to the master cylinder MCL, and when the braking operation member BP is operated, the braking fluid is discharged (pumped) from the master cylinder MCL to the master cylinder pipe HMC. The master cylinder pipe HMC is a fluid passage connecting the master cylinder MCL and the switch valve VKR.

The stroke simulator (which may simply be termed a simulator) SSM is provided to generate the operational force in the braking operation member BP. The simulator cutoff valve (which may simply be termed a cutoff valve) VSM is provided between a fluid pressure chamber in the master cylinder MCL and the simulator SSM. The cutoff valve VSM is a two-position electromagnetic valve including an open position and a closed position. When the cutoff valve VSM is in the open position, the master cylinder MCL and the simulator SSM are in a communicated state, and when the cutoff valve VSM is at the closed position, the master cylinder MCL and the simulator SSM are in a cutoff state (non-communicated state). The cutoff valve VSM is controlled by the drive signal Vsm from the control means CTL. As the cutoff valve VSM, a normally-closed electromagnetic valve (NC valve) may be employed.

A piston and an elastic body (for example, a compression spring) are provided inside the simulator SSM. The braking fluid is moved from the master cylinder MCL to the simulator SSM, and the piston is pressed by the inflowing braking fluid. A force in a direction inhibiting the inflow of the braking fluid is applied to the piston by the elastic body. The elastic body generates the operational force (for example, brake pedaling force) for the case where the braking operation member BP is operated.

<<Pressurizing Unit KAU>>

The pressurizing unit KAU discharges (pumps) the braking fluid to the pressurizing cylinder pipe HKC by using the electric motor MTR as its power source. Further, the pressurizing unit KAU pushes (presses against) the friction members MSB against the rotating member KTB by the pumped pressure to provide the brake torque (braking force) to the wheel WH. In other words, the pressurizing unit KAU generates the force of pressing the friction members MSB against the rotating member KTB (pressing force) by using the electric motor MTR.

The pressurizing unit KAU is configured of the electric motor MTR, the driving circuit DRV, a power transmission mechanism DDK, a pressurizing rod KRD, a pressurizing cylinder KCL, a pressurizing piston PKC, and the pressing force acquisition means FPA.

The electric motor MTR is the power source for the pressurizing cylinder KCL (which is a part of the pressurizing unit KAU) to adjust the pressure (increase or reduce pressure or the like) of the braking fluid in the wheel cylinder WC. For example, as the electric motor MTR, a three-phase brushless motor may be employed. The electric motor MTR includes three coils CLU, CLV, CLW and is driven by the driving circuit DRV. The electric motor MTR is provided with the rotation angle acquisition means (rotation angle sensor) MKA for acquiring (detecting) a rotor position (rotation angle) Mka of the electric motor MTR. The rotation angle Mka is inputted to the control means CTL.

The driving circuit DRV is an electric circuit board in which switching elements (power semiconductor devices) for driving the electric motor MTR or the like are mounted. Specifically, a bridge circuit BRG is formed on the driving circuit DRV, and an electric conduction state to the electric motor MTR is controlled based on the drive signals (Su1, etc.). The driving circuit DRV is provided with an electric conduction amount acquisition means (current sensor) IMA for acquiring (detecting) an actual electric conduction amount (electric conduction amount to each phase) Ima to the electric motor MTR. The electric conduction amount (detection value) Ima of each phase is inputted to the control means CTL.

The power transmission mechanism DDK decelerates rotary power of the electric motor MTR, converts the same to linear power, and output it to the pressurizing rod KRD. Specifically, the power transmission mechanism DDK is provided with a reduction gear (not illustrated), and the rotary power from the electric motor MTR is decelerated and outputted to a screw member (not illustrated). Then, the rotary power is converted to the linear power for the pressurizing rod KRD by the screw member. That is, the power transmission mechanism DDK is a rotary-linear conversion mechanism.

The pressurizing rod KRD has the pressurizing piston PKC fixed thereto. The pressurizing piston PKC is inserted to an inner hole of the pressurizing cylinder KCL, and a combination of a piston and a cylinder is thereby formed. Specifically, a seal member (not illustrated) is provided on an outer periphery of the pressurizing piston PKC, and fluid sealing performance is ensured with the inner hole (inner wall) of the pressurizing cylinder KCL. That is, a fluid chamber Rkc (which will be termed a "pressurizing chamber Rkc") in which the braking fluid is filled defined by the pressurizing cylinder KCL pressurizing piston PKC is thereby formed.

In the pressurizing cylinder KCL, a volume of the pressurizing chamber Rkc is changed by the pressurizing piston PKC being moved in a center axis direction. By this volume change, the braking fluid is moved between the pressurizing cylinder KCL and the wheel cylinder WC through the braking pipes (pipes) HKC, HWC. The fluid pressure in each wheel cylinder WC is adjusted by input and output of the braking fluid into and from the pressurizing cylinder KCL, as a result of which the force by which the friction members MSB press the rotating member KTB (pressing force) is adjusted.

For example, as the pressing force acquisition means FPA, a fluid pressure sensor configured to acquire (detect) a fluid pressure Fpa of the pressurizing chamber Rkc is provided in the pressurizing unit KAU (especially the pressurizing cylinder KCL). The fluid pressure sensor (corresponding to the pressing force acquisition means) FPA is fixed to the pressurizing cylinder KCL, and is configured integrally with the pressurizing unit KAU. A detection value Fpa of the pressing force (that is, the fluid pressure in the pressurizing chamber Rkc) is inputted to the control means (controller) CTL. As above, the pressurizing unit KAU has been explained.

The switch valve VKR switches a state in which the wheel cylinder WC is connected to the master cylinder MCL and a state in which the wheel cylinder WC is connected to the pressurizing cylinder KCL. The switch valve VKR is controlled based on the drive signal Vkr from the control means CTL. Specifically, when a braking operation is not being performed (Bpa<bp0), the wheel cylinder pipe HWC is in the communicated state with the master cylinder pipe HMC through the switch valve VKR, and is in the non-communicated (cutoff) state with the cylinder pipe HKC. Here, the wheel cylinder pipe HWC is a passage connected to the wheel cylinder WC. When the braking operation is performed (that is, when a state of Bpa≥bp0 is realized), the switch valve VKR is excited based on the drive signal Vkr, the communication between the wheel cylinder pipe HWC and the master cylinder pipe HMC is cut off, and the wheel cylinder pipe HWC and the pressurizing cylinder pipe HKC are set to be in the communicated state.

The brake caliper (which may simply be termed a caliper) CRP is provided in the wheel WH, provides the brake torque to the wheel WH, and causes the braking force to be generated therein. As the caliper CRP, a floating type caliper may be employed. The caliper CRP is configured to interpose the rotating member (for example, a brake disk) KTB between two friction members (for example, brake pads) MSB. The wheel cylinder WC is provided in the caliper CRP. The fluid pressure in the wheel cylinder WC is adjusted, by which the piston in the wheel cylinder WC is moved (advances or retreats) relative to the rotating member KTB. This movement of the piston presses the friction members MSB against the rotating member KTB, and the pressing force Fpa is thereby generated.

Figure 1:
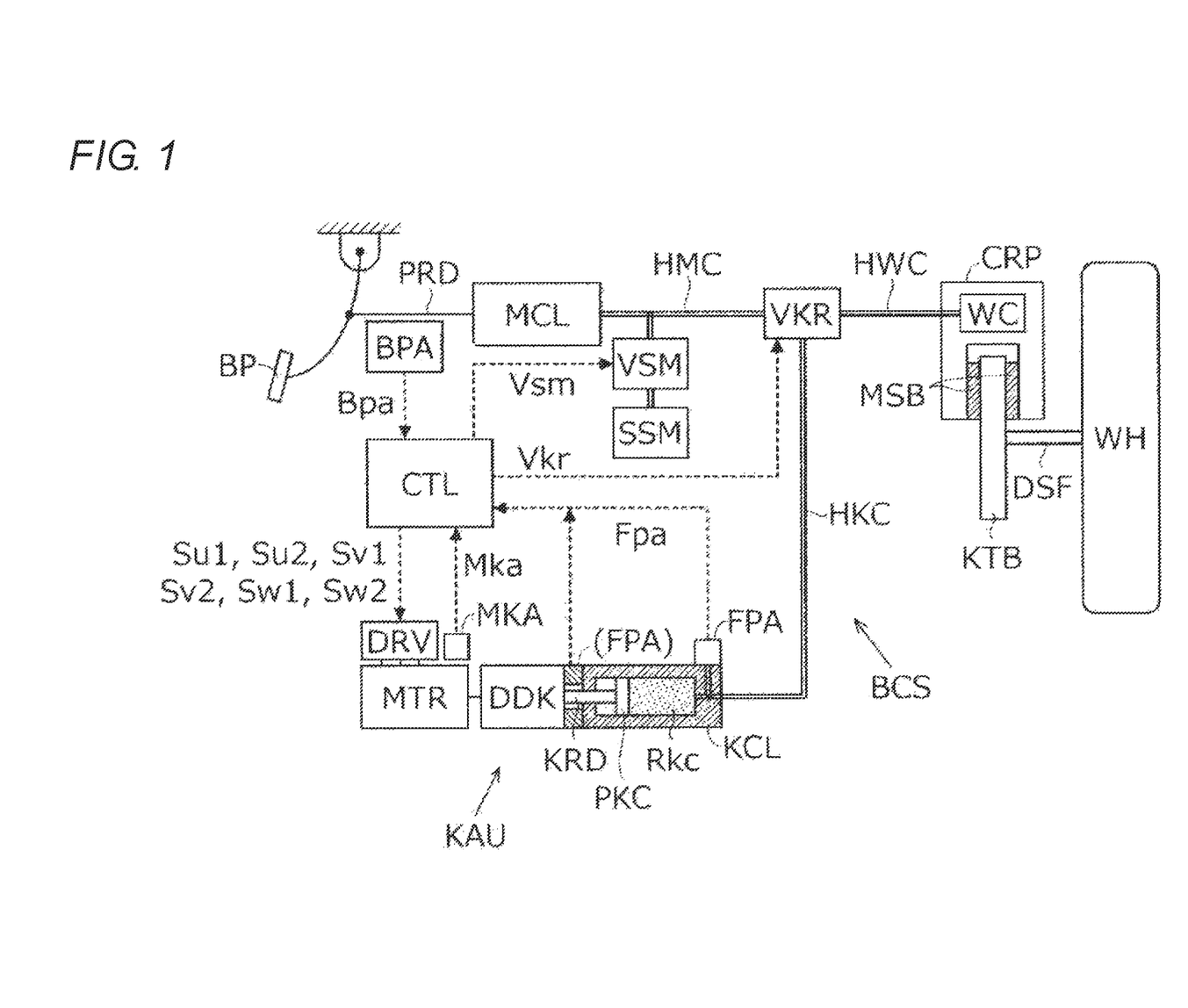
FIG. 1 is an overall configurational diagram of a vehicle mounted with a braking control device for vehicle according to the present invention.

FIG. 1 exemplifies a configuration of a disk type brake device (disk brake). In this case, the friction members MSB are brake pads, and the rotating member KTB is a brake disk. Instead of the disk type brake device, a drum type brake device (drum brake) may be employed. In a case of the drum brake, a brake drum is employed instead of the caliper CRP. Further, the friction members MSB are brake shoes and the rotary member KTB is the brake drum.

Further in FIG. 1, the output of the electric motor MTR is converted to the force by which the friction members MSB press the rotating member KTB (pressing force) via the braking fluid, however, a configuration in which the friction members MSB press the rotating member KTB directly without intervention of the braking fluid may be employed. In this configuration, the pressurizing unit KAU is directly fixed to the caliper CRP instead of the wheel cylinder WC. Further, the friction members MSB are pressed against the rotating member KTB by the pressurizing piston PKC of the pressurizing unit KAU. The pressing force acquisition means FPA (FPA with a round parentheses) is arranged between the power transmission mechanism DDK (for example, the reduction gear, the screw mechanism) and the pressurizing cylinder KCL so as to acquire the actual pressing force Fpa. In this configuration, the braking fluid is not used, so the pressurizing chamber Rkc is not formed.

<Processes in Control Means CTL>

Figure 2:
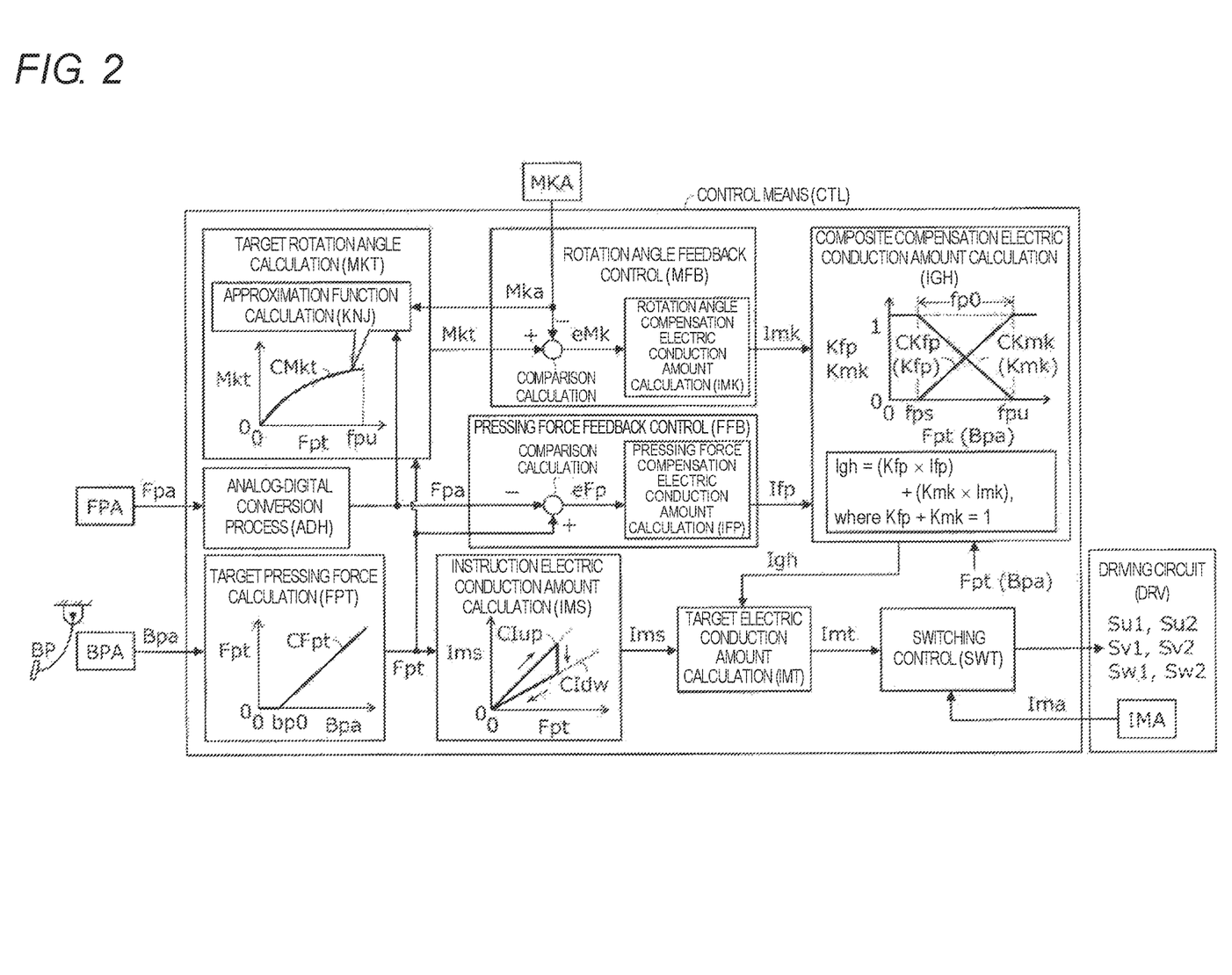
FIG. 2 is a functional block diagram for explaining processes in a control means (controller).

With reference to a functional block diagram in FIG. 2, processes in the control means (controller) CTL will be described. Here, an example in which the brushless motor is employed as the electric motor MTR will be described.

Signals Su1, Su2, Sv1, Sv2, Sw1, Sw2 (which may simply be denoted "Su1 to Sw2") for driving switching elements SU1, SU2, SV1, SV2, SW1, SW2 (which may simply be denoted "SU1 to SW2") of the driving circuit DRV to be described later are calculated by the control means CTL. The control means CTL is configured of a target pressing force calculation block FPT, an instruction electric conduction amount calculation block IMS, an analog-digital conversion process block ADH, a pressing force feedback control block FFB, a target rotation angle calculation block MKT, a rotation angle feedback control block MFB, a composite compensation electric conduction amount calculation block IGH, a target electric conduction amount calculation block IMT, and a switching control block SWT.

In the target pressing force calculation block FPT, a target pressing force Fpt is calculated based on the braking operation amount Bpa and a calculation characteristic (calculation map) CFpt. Here, the target pressing force Fpt is a target value of the fluid pressure (corresponding to the pressing force) generated by the pressurizing unit KAU. Specifically, in the calculation characteristic CFpt, the target pressing force Fpt is calculated as "0 (zero)" in a range where the braking operation amount Bpa is equal to or greater than zero (corresponding to a case where the braking operation is not being performed) to less than a predetermined value bp0, and the target pressing force Fpt is calculated to increase monotonically from zero according to an increase in the operation amount Bpa when the operation amount Bpa is equal to or greater than the predetermined value bp0. Here, the predetermined value bp0 is a value corresponding to a "play" of the braking operation member BP.

In the instruction electric conduction amount calculation block IMS, an instruction electric conduction amount Ims for the electric motor MTR driving the pressurizing unit KAU (a target value of the electric conduction amount for controlling the electric motor MTR) is calculated based on the target pressing force Fpt and preset calculation characteristics (calculation maps) CIup, CIdw. The calculation map for the instruction electric conduction amount Ims is configured of two characteristics by taking into account an influence of hysteresis by the power transmission mechanism DDK and the like, namely the characteristic CIup for a case where the target pressing force Fpt increases and the characteristic CIdw for a case where the target pressing force Fpt decreases.

Here, the "electric conduction amount" is a state quantity (state variable) for controlling the output torque of the electric motor MTR. Since the electric motor MTR outputs the torque that is substantially proportional to current, a current target value of the electric motor MTR may be used as the target value (target electric conduction amount) of the electric conduction amount. Further, since the current increases as a result of increasing a supplied voltage to the electric motor MTR, a supplied voltage value may be used as the target electricity amount. Moreover, since the supplied voltage value may be modulated by a duty ratio in pulse width modulation, this duty ratio (ratio of electrically conducting time in a cycle) may be used as the electric conduction amount.

In a case where an analog type sensor is employed as the pressing force acquisition means FPA, a detection result (analog value) of the pressing force acquisition means FPA is converted to a digital value in the analog-digital conversion process block ADH, and the actual pressing force Fpa is read by the control means CTL. In the analog-digital conversion process block ADH, a so-called analog-digital conversion (which is also called an AD conversion) is performed. In so doing, a resolution of the pressing force Fpa (Least Significant Bit, LSB) is determined according to a bit number of the conversion means ADH. For example, in a case where the analog-digital conversion process block ADH is 10 bit, an output of the pressing force acquisition means FPA is taken into the control means CTL as a digital value divided by 2 to the power of ten in a dynamic range thereof.

<<Pressing Force Feedback Control Block FFB>>

In the pressing force feedback control block FFB, a target value of the pressing force (for example, target fluid pressure) Fpt and an actual value of the pressing force (fluid pressure detection value) Fpa are used as state variables of control, and a compensation electric conduction amount Ifp of the electric motor MTR is calculated based thereon. An error occurs in the pressing force by a mere control based on the instruction electric conduction amount Ims, and as such, this error is compensated in the pressing force feedback control block FFB. The pressing force feedback control block FFB is configured of a comparison calculation and a pressing force compensation electric conduction amount calculation block IPF.

The comparison calculation compares the target value Fpt and the actual value Fpa of the pressing force. Here, the actual value Fpa of the pressing force is a detection value acquired (detected) by the pressing force sensor FPA (for example, fluid pressure sensor). In the comparison calculation, a deviation (pressing force deviation) eFp of the target pressing force (target value) Fpt and the actual pressing force (detection value) Fpa is calculated. The pressing force deviation eFp (which is a control variable, and is "pressure" in terms of physical quantity) is inputted to the pressing force compensation electric conduction amount calculation block IPF.

The pressing force compensation electric conduction amount calculation block IPF includes a proportional element block, a differentiating element block, and an integrating element block. In the proportional element block, a proportional gain Kpp is multiplied to the pressing force deviation eFp to calculate a proportional element of the pressing force deviation eFp. In the differentiating element block, the pressing force deviation eFp is differentiated, to which a differential gain Kpd is multiplied to calculate a differentiating element of the pressing force deviation eFp. In the integrating element block, the pressing force deviation eFp is integrated, to which an integrating gain Kpi is multiplied to calculate an integrating element of the pressing force deviation eFp. Then, the pressing force compensation electric conduction amount Ifp is calculated by adding the proportional element, the differentiating element, and the integrating element. That is, in the pressing force compensation electric conduction amount calculation block IPF, a so-called PID control feedback loop based on the pressing force is formed based on a comparison result of the target pressing force Fpt and the actual pressing force Fpa so that the actual pressing force (detection value) Fpa matches the target pressing force (target value) Fpt of the pressing force (that is, the deviation eFp approaches "0 (zero)"). The pressing force feedback control block FFB has been described above.

In the target rotation angle calculation block MKT, the target rotation angle Mkt is calculated based on the target pressing force Fpt and the calculation characteristic (calculation map) CMkt. Here, the target rotation angle Mkt is a target value of the rotation angle of the electric motor MTR. Specifically, it is calculated so that it increases monotonically with an "upwardly convex" characteristic from "0 (zero)" accompanying an increase in the target pressing force Fpt, according to the calculation characteristic CMkt for the target rotation angle Mkt. The target rotation angle Mkt is calculated as a value corresponding to the target pressing force Fpt in the pressurizing unit KAU. Thus, the calculation characteristic CMkt for the target rotation angle Mkt is set based on rigidities (spring constants) of the caliper CRP, the friction members MSB, and the like, and specifications of the wheel cylinder WC and the pressurizing cylinder KCL (pressure receiving areas), and the like, and is successively updated based thereon.

The target rotation angle calculation block MKT includes an approximation function calculation block KNJ. In the approximation function calculation block KNJ, the approximation function Knj is calculated based on the actual pressing force Fpa and the actual rotation angle Mka. The approximation function Knj is updated and set as a new calculation map CMkt (Fpt-Mkt characteristic). Processes in the approximation function calculation block KNJ will be described later.

<<Rotation Angle Feedback Control Block MFB>>

In the rotation angle feedback control block MFB, the rotation angle target value (target rotation angle) Mkt and the rotation angle actual value (detection value) Mka are used as state variables of the control, and an compensation electric conduction amount Imk of the electric motor MTR is calculated based thereon. Since a braking pressure and a motor rotation angle have correlated relationship through the rigidity of the caliper CRP and the like and the specification of the pressurizing cylinder KCL and the like, the rotation angle feedback control block MFB complements the pressing force feedback control. That is, the rotation angle feedback control block MFB have a similar configuration as the pressing force feedback control block FFB. The rotation angle feedback control block MFB is configured of a comparison calculation and a rotation angle compensation electric conduction amount calculation block IMK.

The comparison calculation compares the target value (target rotation angle) Mkt and the actual value (detection value) Mka of the rotation angle of the electric motor MTR. Here, the actual value Mka of the rotation angle is a detection value of the rotation angle (actual rotation angle) acquired (detected) by the rotation angle sensor MKA. For example, in the comparison calculation, a deviation (rotation angle deviation) eMk of the target rotation angle (target value) Mkt and the actual rotation angle (detection value) Mka is calculated. The rotation angle deviation eMk (control variable) is inputted to the rotation angle compensation electric conduction amount calculation block IMK.

The rotation angle compensation electric conduction amount calculation block IMK includes a proportional element block a differentiating element block, and an integrating element block. In the proportional element block, a proportional gain Kmp is multiplied to the rotation angle deviation eMk to calculate a proportional element of the rotation angle deviation eMk. In the differentiating element block, the rotation angle deviation eMk is differentiated, to which a differential gain Kmd is multiplied to calculate a differentiating element of the rotation angle deviation eMk. In the integrating element block, the rotation angle deviation eMk is integrated, to which an integrating gain Kmi is multiplied to calculate an integrating element of the rotation angle deviation eMk. Then, the rotation angle compensation electric conduction amount Imk is calculated by adding the proportional element, the differentiating element, and the integrating element. That is, in the rotation angle compensation electric conduction amount calculation block IMK, a so-called PID control feedback loop based on the rotation angle is formed based on a comparison result of the target rotation angle Mkt and the actual rotation angle Mka so that the actual rotation angle (detection value) Mka matches the target rotation angle (target value) Mkt (that is, the deviation eMk approaches "0 (zero)"). The rotation angle feedback control block MFB has been described above.

<<Composite Compensation Electric Conduction Amount Calculation Block IGH>>

In the composite compensation electric conduction amount calculation block IGH, the pressing force compensation electric conduction amount Ifp and the rotation angle compensation electric conduction amount Imk are composed to calculate a composite compensation electric conduction amount Igh, which is a final compensation electric conduction amount. As described above, since the pressing force compensation electric conduction amount Ifp and the rotation angle compensation electric conduction amount Imk correspond to each other, the pressing force compensation electric conduction amount Ifp is adjusted by a pressing force coefficient Kfp and the rotation angle compensation electric conduction amount Imk is adjusted by a rotation angle coefficient Kmk, as a result of which the composite compensation electric conduction amount Igh is calculated.

Firstly, in the composite compensation electric conduction amount calculation block IGH, a coefficient Kfp for correcting the pressing force compensation electric conduction amount Ifp is calculated based on the target pressing force Fpt, and a calculation characteristic (calculation map) CKfp of the pressing force coefficient. Specifically, in a range where the target pressing force Fpt is equal to or greater than "0 (zero)" and less than a lower value fps (under a condition of "0≤Fpt<fps"), the pressing force coefficient Kfp is calculated to "0 (zero)". In a range where the target pressing force Fpt is equal to or greater than the lower value fps and less than an upper value fpu (under a condition of "fps≤Fpt<fpu"), the pressing force coefficient Kfp is calculated to increase monotonically from "0" to "1" according to an increase in the target pressing force Fpt. Further, in a case where the target pressing force Fpt is equal to or greater than the upper value fpu (under a condition of "Fpt≥fpu"), the pressing force coefficient Kfp is calculated to "1". Here, the lower value fps and the upper value fpu are preset predetermined values (thresholds for determination), and the upper value fpu is a value that is equal to or greater than the lower value fps. In other words, the lower value fps is a value that is equal to or less than the upper value fpu. For example, the upper value fpu may be set as a value that is greater than the lower value fps by a predetermined value fp0 for smooth transition of the pressing force feedback control (for example, transition from control prohibition to control execution).

Similarly, in the composite compensation electric conduction amount calculation block IGH, a coefficient Kmk for correcting the rotation angle compensation electric conduction amount Imk is calculated based on the target pressing force Fpt and a calculation characteristic (calculation map) CKmk of the rotation angle coefficient. Specifically, in the range where the target pressing force Fpt is equal to or greater than "0 (zero)" and less than the lower value fps (under the condition of "0≤Fpt<fps"), the p rotation angle coefficient Kmk is calculated to "1". In the range where the target pressing force Fpt is equal to or greater than the lower value fps and less than the upper value fpu (under the condition of "fps≤Fpt<fpu"), the rotation angle coefficient Kmk is calculated to decrease monotonically from "1" to "0" according to the increase in the target pressing force Fpt. Further, in the case where the target pressing force Fpt is equal to or greater than the upper value fpu (under the condition of "Fpt≥fpu"), the rotation angle coefficient Kmk is calculated to "0 (zero)". Similar to the above, the lower value fps and the upper value fpu are the preset predetermined values (thresholds for determination), and the upper value fpu is a value that is equal to or greater than the lower value fps (the lower value fps is a value that is equal to or less than the upper value fpu). For example, the upper value fpu may be set as the value that is greater than the lower value fps by the predetermined value fp0 for smooth transition of the rotation angle feedback control (for example, transition from control execution to control prohibition). Here, a relationship of the pressing force coefficient Kfp and the rotation angle coefficient Kmk is set to a total of "1" (Kfp+Kmk=1).

Further, in the composite compensation electric conduction amount calculation block IGH, the pressing force compensation electric conduction amount Ifp and the rotation angle compensation electric conduction amount Imk are composed based on the pressing force coefficient Kfp and the rotation angle coefficient Kmk to calculate the composite compensation electric conduction amount Igh. That is, in the calculation of the composite compensation electric conduction amount, a degree of influence (which is also called a degree of contribution) of the pressing force compensation electric conduction amount Ifp is taken into account by the pressing force coefficient Kfp, and a degree of influence of the rotation angle compensation electric conduction amount Imk is taken into account by the rotation angle coefficient Kmk. Specifically, the composite compensation electric conduction amount Igh is calculated by adding "a value in which the pressing force coefficient (degree of influence of pressing force) Kfp is multiplied to the pressing force compensation electric conduction amount Ifp" and "a value in which the rotation angle coefficient (degree of influence of rotation angle) Kmk is multiplied to the rotation angle compensation electric conduction amount Imk" (Igh= (Kfp*Ifp)+(Kmk*Imk)). For example, in a case of "Kfp=0.3, Kmk=0.7", the degree of influence of the pressing force compensation electric conduction amount Ifp is 30%, and the degree of influence of the rotation angle compensation electric conduction amount Imk is 70% in the composite compensation electric conduction amount Igh.

In the case where the target pressing force Fpt is small and "0≤Fpt<fps" is satisfied, "Kfp=0, Kmk=1 (the degree of contribution of the rotation angle compensation electric conduction amount Imk being 100%)" are calculated, so the pressing force compensation electric conduction amount Ifp is not employed in the calculation of the composite compensation electric conduction amount Igh and only the rotation angle compensation electric conduction amount Imk is employed therein. In the feedback control, the degree of contribution of the actual pressing force Fpa is set to zero, and the degree of contribution becomes fully that of the rotation angle Mka. That is, the pressing force feedback control is prohibited and only the rotation angle feedback control is executed, and the output of the electric motor MTR is finely adjusted based thereon.

In the case where the target pressing force Fpt becomes relatively large and "fps≤Fpt<fpu" is satisfied, the rotation angle coefficient Kmk is calculated by being decreased from "1" and the pressing force coefficient Kfp is calculated by being increased from "0" according to the increase in the target pressing force Fpt. Due to this, the composite compensation electric conduction amount Igh is calculated with the degrees of influence of the rotation angle compensation electric conduction amount Imk (that is, the rotation angle Mka) and the pressing force compensation electric conduction amount Ifp (that is, the actual pressing force Fpa) being taken into account using the coefficients Kfp, Kmk. That is, both the pressing force feedback control and the rotation angle feedback control are executed, and the output of the electric motor MTR is finely adjusted based thereon.

In the case where the target pressing force Fpt is large and "Fpt≥fpu" is satisfied, "Kfp=1, Kmk=0 (the degree of contribution of the pressing force compensation electric conduction amount Ifp being 100%)" are calculated, so the rotation angle compensation electric conduction amount Imk is not employed in the calculation of the composite compensation electric conduction amount Igh and only the pressing force compensation electric conduction amount Ifp is employed therein. In the feedback control, the degree of contribution of the rotation angle Mka is set to zero, and the degree of contribution becomes fully that of the actual pressing force Fpa. That is, the rotation angle feedback control is prohibited and only the pressing force feedback control is executed, and the output of the electric motor MTR is finely adjusted based thereon.

As above, the two feedback control loops are adjusted based on the target pressing force Fpt, and only the feedback control loop related to the pressing force (brake fluid pressure) is enabled when the target pressing force Fpt is large to ensure a matching accuracy of magnitudes of the pressing force. On the other hand, when the target pressing force Fpt is small, only the feedback control loop related to the rotation angle is enabled, and the detected pressing force Fpa is not employed in the feedback control. Due to this, a smooth control with a high resolution of pressing force can be executed. In addition, since the coefficients Kfp, Kmk are gradually changed according to the changes in the target pressing force Fpt, so a mutual transition of the two feedback controls can take place smoothly.

Since the target pressing force Fpt is calculated based on the braking operation amount Bpa, the operation amount Bpa may be employed instead of the target pressing force Fpt in each of the characteristics CKfp, Ckmk for calculating the coefficients Kfp, Kmk. Here, the braking operation amount Bpa and the target pressing force Fpt may each be termed an "operation amount corresponding value". That is, the coefficients Kfp, Kmk are calculated based on the operation amount corresponding values. The composite compensation electric conduction amount calculation block IGH has been described above.

In the target electric conduction amount calculation block IMT, the target electric conduction amount Imt, which is the final target value of the electric conduction amount, is calculated based on the instruction electric conduction amount (target value) Ims and the composite compensation electric conduction amount (compensation amount by the feedback control) Igh. Specifically, the composite compensation electric conduction amount Igh is added to the instruction electric conduction amount Ims, and a sum thereof is calculated as the target electric conduction amount Imt (that is, Imt=Ims+Igh).

In the target electric conduction amount calculation block IMT, a sign of the target electric conduction amount Imt (a value thereof being positive or negative) is determined based on a direction in which the electric motor MTR is to rotate (that is, increasing or decreasing direction of the pressing force). Further, a magnitude of the target electric conduction amount Imt is calculated based on rotary power which the electric motor MTR is to output (that is, increasing or decreasing amount of the pressing force). Specifically, the sign of the target electric conduction amount Imt is calculated as a positive sign (Imt>0) in a case of increasing the brake pressure, and the electric motor MTR is driven in a forward direction. On the other hand, the sign of the target electric conduction amount Imt is calculated as a negative sign (Imt<0) in a case of decreasing the brake pressure, and the electric motor MTR is driven in a reverse direction. Further, the output torque of the electric motor MTR is controlled to be larger when an absolute value of the target electric conduction amount Imt is larger, and the output torque is controlled to be smaller when the absolute value of the target electric conduction amount Imt is smaller.

In the switching control block SWT, drive signals Su1 to Sw2 for performing pulse width modulation of the respective switching elements SU1 to SW2 are calculated based on the target electric conduction amount Imt. In the case where the electric motor MTR is a brushless motor, target values Iut, Ivt, Iwt of electric conduction amounts of the respective phases (U phase, V phase, and W phase) are calculated based on the target electric conduction amount Imt and the rotation angle Mka. Duty ratios Dut, Dvt, Dwt of pulse widths of the respective phases (ratio of an on-period in one cycle) are determined based on the target electric conduction amounts Jut, Ivt, Iwt of the respective phases. Then, the drive signals Su1 to Sw2 that determine whether the respective switching elements SU1 to SW2 configuring the bridge circuit BRG are to be in an on-state (electrically conducted state) or an off-state (electrically non-conducted state) are calculated based on the duty ratios (target values) Dut, Dvt, Dwt. The drive signals Su1 to Sw2 are outputted to the driving circuit DRV.

The six drive signals Su1 to Sw2 individually control electrically conducted and non-conducted states of the six switching elements SU1 to SW2. Here, a conduction time per unit time is made longer in each switching element when the duty ratio thereof is larger, and larger current is flown in a coil thereof. Thus, rotary power of the electric motor MTR is made large.

The driving circuit DRV is provided with the electric conduction amount acquisition means (for example, current sensor) IMA for each phase, and the actual electric conduction amount (collective term for the respective phases) Ima is acquired (detected) thereby. The detection value (for example, actual current value) Ima of each phase is inputted to the switching control block SWT. Then, a so-called current feedback control is performed so that the detection value Ima of the respective phases match the target values Iut, Ivt, Iwt. Specifically, in the respective phases, the duty ratios Dut, Dvt, Dwt are modified (finely adjusted) based on deviations between the actual electric conduction amount Ima and the target electric conduction amounts Iut, Ivt, Iwt. A high-precision motor control can be achieved by this current feedback control.

<Calculation Map CMkt Based on Approximate Polynomial>

Figure 3:
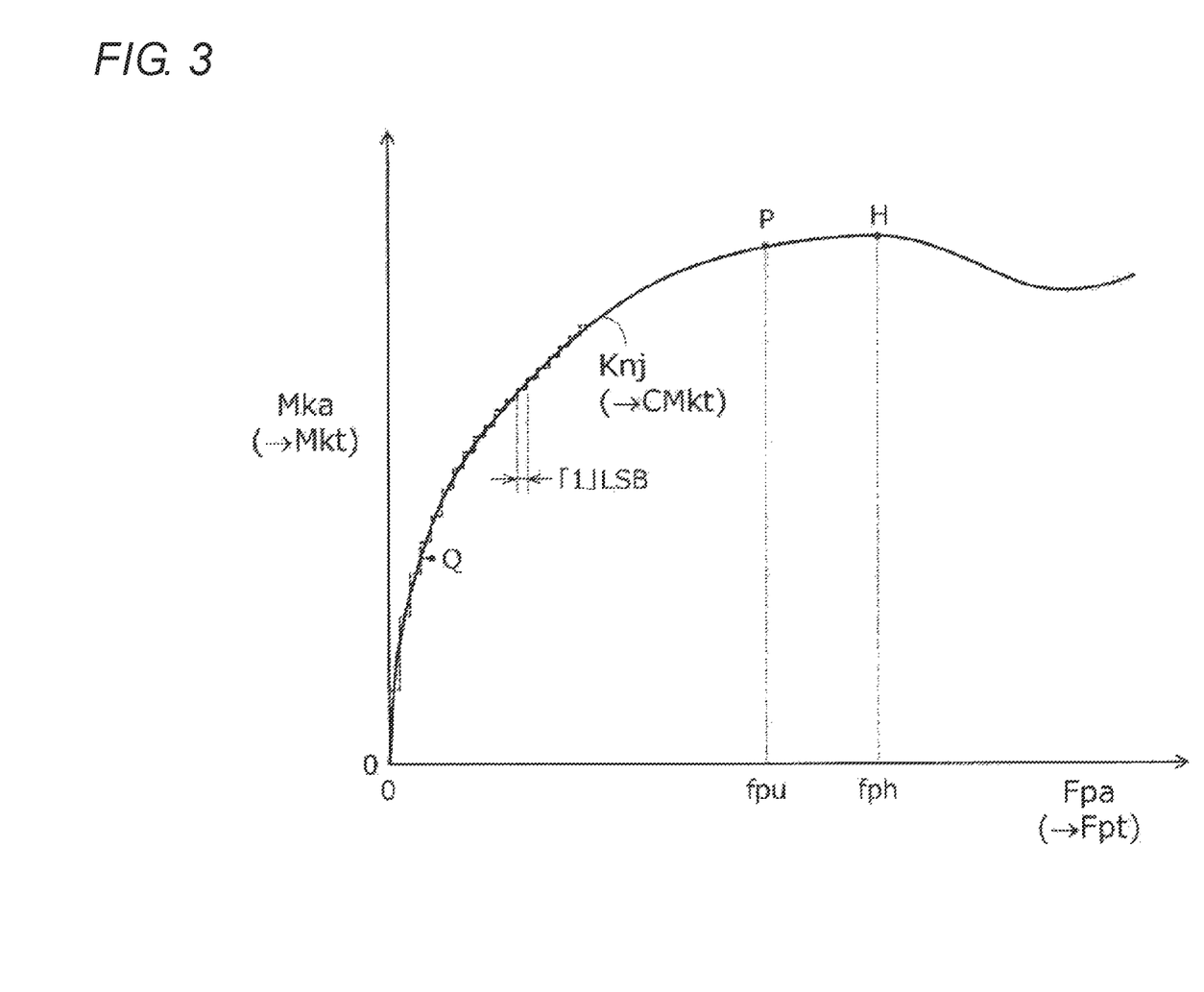
FIG. 3 is a characteristic diagram for explaining a calculation map CMkt based on an approximate polynomial.

Processes in the approximation function calculation block KNJ will be described with reference to a characteristic diagram of FIG. 3. The approximation function calculation block KNJ stores the output value Fpa of the analog-digital conversion process block ADH and the detection value Mka of the rotation angle acquisition means MKA by synchronizing them. The calculation map CMkt is created based on stored time series data. The calculation map CMkt (Fpt-Mkt characteristic) can be set as an initial characteristic based on rigidities (spring constants) of the caliper CRP, the friction members MSB, and the like, and specifications of the wheel cylinder WC and the pressurizing cylinder KCL (pressure receiving areas), and the like. However, the rigidity of the friction members MSB changes over time due to wear. Due to this, the calculation map CMkt is created based on a correlation of the actual pressing force Fpa and the actual rotation angle Mka, for example, each time a series of braking operation is performed, and is successively updated based thereon. Here, the "series of braking operation" refers to a start to an end of the braking operation. The calculation map CMkt is set as polynomial with its degree being "2" or higher.

The approximation function calculation block KNJ is formed in the target rotation angle calculation block MKT. In the approximation function calculation block KNJ, the approximation function Knj is calculated based on the actual pressing force Fpa and the actual rotation angle Mka. Specifically, the actual pressing force Fpa and the actual rotation angle Mka are measured in chronologic synchrony, and are stored as time series data set. With this data set, the actual rotation angle Mka with respect to the actual pressing force Fpa is approximated as the polynomial having the second or higher degree by post-processing (processes after the series of braking operation from the start to the end of the braking operation). Here, an approximated relationship of the actual pressing force Fpa and the actual rotation angle Mka is termed the "approximation function Knj".

Since the actual pressing force Fpa is inputted to the control means CTL after being subjected to the processes in the analog-digital conversion process block ADH, it is detected as a step-wise value for every "1 (unit)" LSB as shown by a broken line. Since the relationship of the actual pressing force Fpa and the actual rotation angle Mka is expressed as the polynomial approximation function Knj, the step-wise data generated by the LSB (being the least significant bit and the signal resolution) is interpolated.

Further, an influence of noise as shown by a point Q may be imposed on a detection signal. The influence of noise may be compensated by a filter. However, when a filter is used, the detection value is chronologically delayed, and it might become difficult to comply with a relatively fast braking operation. Since the stored data is smoothed by the approximation function Knj, the correlation of the actual pressing force Fpa and the actual rotation angle Mka can be acquired accurately even with a fast braking operation.

The approximation function Knj is set as a new calculation map CMkt so that it may be used in subsequent and oncoming braking operations. The actual pressing force Fpa is replaced with the target pressing force Fpt and the actual rotation angle Mka is replaced with the target rotation angle Mkt, and an updated calculation map CMkt is thereby determined. That is, the target rotation angle Mkt is set as a function map expressed in polynomial with the second or higher degree which uses the target pressing force Fpt as its variable and passes through the origin (that is, Mkt=0 when Fpt=0). As above, the approximation function Knj is calculated in the series of braking operation, and is successively updated as the calculation map CMkt to be used in the subsequent braking operation, so a deviation in the calculation map caused by the chronological change in the friction members MSB or the like may thereby be compensated.

In a case where a polynomial with the third or higher degree is to be employed as the approximation function Knj, as illustrated, there may be a case where the target rotation angle Mkt does not increase monotonically with respect to the increase in the target pressing force Fpt. Due to this, at least in a section where the function map CMkt is necessary, the approximation function Knj is set as a monotonically increasing function. Specifically, in the approximate calculation process, respective coefficients in the polynomial is determined for the section where the target pressing force Fpt is between "0" and the upper value fpu (which is a value in the calculation of the composite compensation electric conduction amount Igh by which a degree of influence Kmk of the rotation angle compensation electric conduction amount Imk becomes "0") (more accurately, a section that includes "0" but does not include the "predetermined value fpu"), so that the target rotation angle Mkt increases monotonically. In other words, the Fpt-Mkt characteristic does not have an inflection point (a first derivative does not take an extreme value) in the range of O<Fpt<fpu. Thus, even if the approximation function Knj takes an inflection point, the pressing force Fpt at that timing is equal to or greater than the upper value fpu (see a point H where "Fpt=fph").

For example, in the case where the third-degree polynomial (polynomial with the degree of "3") is employed as the approximation function Knj, the calculation map CMkt is expressed by "Fpt=a*Mkt$^3$+b*Mkt$^2$+c*Mkt". Here, coefficients a, b, c are determined so that the target pressing force Fpt increases monotonically in the section of 0≤Fpt≤fpu. Since the calculation map CMkt is set as the monotonically increasing function, a situation where the target rotation angle Mkt decreases despite the increase in the target pressing force Fpt may suitably be avoided.

<Three-Phase Brushless Motor MTR and Driving Circuit DRV Thereof>

Figure 4:
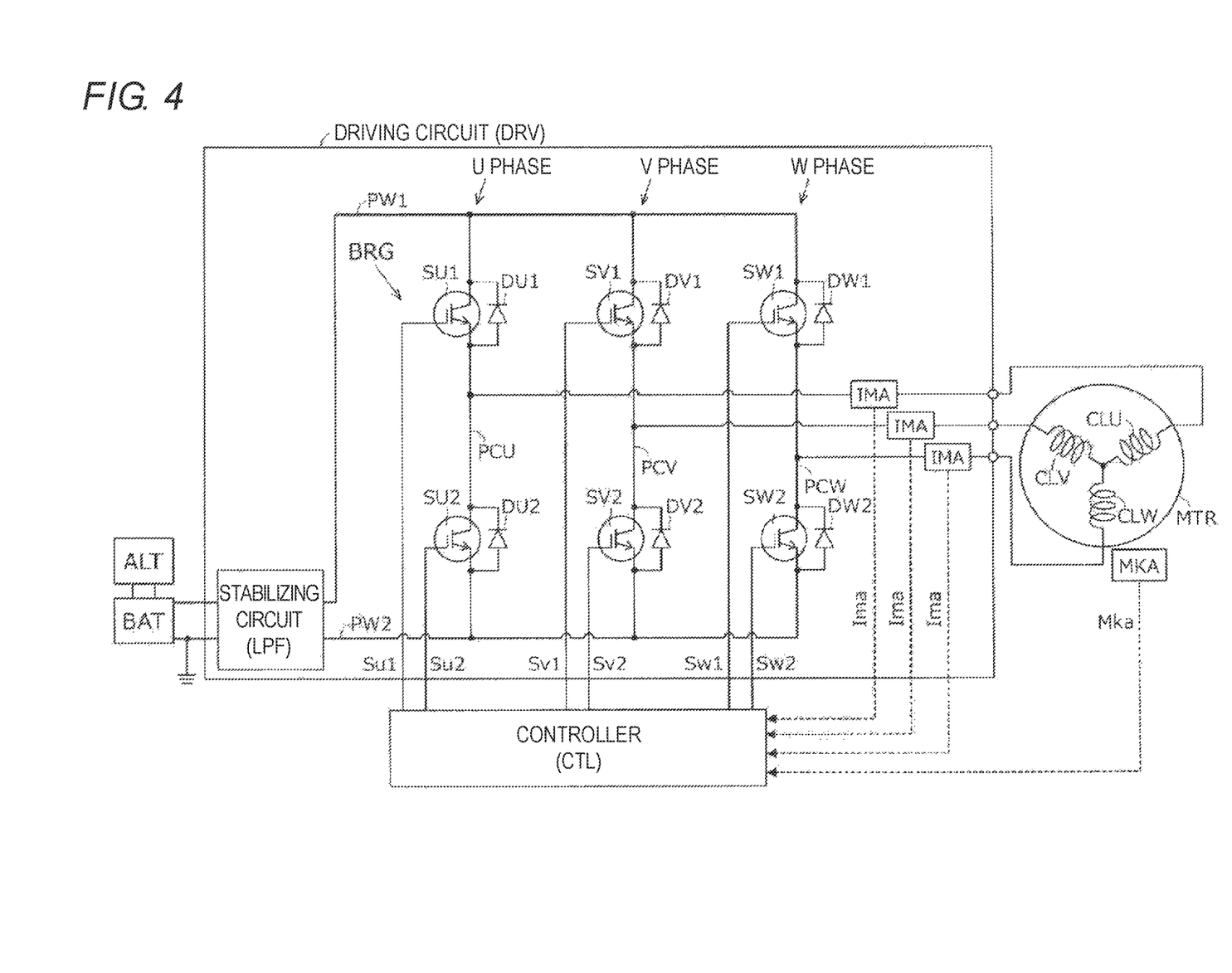
FIG. 4 is a circuit diagram for explaining an electric motor and a driving circuit thereof.

The example in which the three-phase brushless motor including three coils (wirings), namely the U-phase coil CLU, the V-phase coil CLV, and the W-phase coil CLW is employed as the electric motor MTR will be described with reference to a circuit diagram of FIG. 4. In the brushless motor MTR, magnets are arranged on a rotor (rotor) side, and wiring circuits (coils) are arranged on a stator (stator) side. The electric motor MTR commutates by the driving circuit DRV at timings matching magnetic poles of the rotor, and is driven to rotate.

The electric motor MTR is provided with the rotation angle sensor MKA configured to detect the rotation angle (rotor position) Mka of the electric motor MTR. As the rotation angle sensor MKA, a Hall element type is employed. Further, as the rotation angle sensor MKA, a variable reluctance type resolver may be employed. The detected rotation angle Mka is inputted to the control means CTL.

The driving circuit DRV is an electric circuit configured to drive the electric motor MTR. The electric motor MTR is driven by the driving circuit DRV based on the drive signals Su1, Su2, Sv1, Sv2, Sw1, Sw2 (which may be denoted as "Su1 to Sw2") for the respective phases from the control means CTL. The driving circuit DRV is configured of the three-phase bridge circuit formed by the six switching elements (power transistors) SU1, SU2, SV1, SV2, SW1, SW2 (which may be denoted as "SU1 to SW2") (which may simply be termed bridge circuit) BRG and a stabilizing circuit LPF.

The rechargeable battery BAT is connected to an input side of the three-phase bridge circuit (which may be termed an inverter circuit) BRG via the stabilizing circuit LPF, and the electric motor MTR is connected to an output side of the bridge circuit BRG. In the bridge circuit BRG, a voltage type bridge circuit having an upper and lower arm configuration connecting the switching elements in serial is used for one phase, by which the three phases (U phase, V phase, and W phase) are configured. Upper arms of the three phases are connected to a power line PW1 connected to a positive electrode side of the rechargeable battery BAT. Further, lower arms of the three phases are connected to a power line PW2 connected to a negative electrode side of the rechargeable battery BAT. In the bridge circuit BRG, the upper and lower arms of the respective phases are connected to the power lines PW1, PW2 in parallel to the rechargeable battery BAT.

The U-phase upper arm has a freewheel diode DU1 connected in inverse parallel to the switching element SU1, and the U-phase lower arm has a freewheel diode DU2 connected in inverse parallel to the switching element SU2. Similarly, the V-phase upper arm has a freewheel diode DV1 connected in inverse parallel to the switching element SV1, and the V-phase lower arm has a freewheel diode DV2 connected in inverse parallel to the switching element SV2. Further, the W-phase upper arm has a freewheel diode DW1 connected in inverse parallel to the switching element SW1, and the W-phase lower arm has a freewheel diode DW2 connected in inverse parallel to the switching element SW2. Connecting portions PCU, PCV, PCW of the upper and lower arms of the respective phases form output terminals (alternating current output terminals) of the bridge circuit BRG. These output terminals have the electric motor MTR connected thereto.

The six switching elements SU1 to SW2 are elements that can turn on or turn off a part of the electric circuit. For example, as the switching elements SU1 to SW2, MOSFETs and IGBTs may be employed. In the brushless motor MTR, the switching elements SU1 to SW2 configuring the bridge circuit BRG are controlled based on the rotation angle (rotor position) Mka. Further, directions of the electric conduction amounts (that is, excitation directions) of the coils CLU, CLV, CLW of the respective three phases (U phase, V phase, W phase) are switched sequentially, by which the electric motor MTR is driven to rotate. That is, a rotation direction (forward or reverse direction) of the brushless motor MTR is determined by a relationship between the rotor and a position where magnetic excitation takes place. Here, the forward direction of the electric motor MTR is a rotation direction corresponding to the increase in the pressing force Fpa by the pressurizing unit KAU, and the reverse direction of the electric motor MTR is a rotation direction corresponding to the decrease in the pressing force Fpa.

The electric conduction amount acquisition means IMA for detecting the actual electric conduction amount Ima (collective term for the respective phases) between the bridge circuit BRG and the electric motor MTR is provided for each of the three phases. For example, a current sensor is provided as the electric conduction amount acquisition means IMA, and the current value is detected as the actual electric conduction amount Ima. The detected electric conduction amount Ima of each phase is inputted to the control means (controller) CTL.

The driving circuit DRV receives power supply from a power source (rechargeable battery BAT, generator ALT). To reduce fluctuation in supplied power (voltage), the driving circuit DRV is provided with the stabilizing circuit (which may also be termed a noise reduction circuit) LPF. The stabilizing circuit LPF is configured by a combination of at least one condenser (capacitor) and at least one inductor (coil), and is a so-called LC circuit (which may also be termed a LC filter).

As the electric motor MTR, a motor with brush (which may simply be termed a brush motor) may be employed instead of the brushless motor. In this case, an H bridge circuit configured of four switching elements (power transistors) is used as the bridge circuit BRG. That is, in the bridge circuit BRG of the brush motor, one of the three phases in the brushless motor is omitted. Similar to the case of the brushless motor, the electric motor MTR is provided with the rotation angle sensor MKA, and the driving circuit DRV is provided with the stabilizing circuit LPF. Moreover, the driving circuit DRV is provided with the electric conduction amount acquisition means IMA.

<Workings and Effects>

In the braking control device BCS, the pressing force (actual pressing force) Fpa by which the friction members MSB press against the rotating member KTB is directly detected by the pressing force acquisition means FPA (for example, a fluid pressure sensor). Further, the rotation angle (actual rotation angle) Mka of the electric motor MTR is detected by the rotation angle acquisition means MKA. Further, the target rotation angle Mkt is calculated based on the relationship of the rotation angle of the electric motor and the pressing force (calculation map) CMkt. In the braking control device BCS, the feedback control is performed by two control loops, namely the feedback control loop for the pressing force and the feedback control loop for the rotation angle.

Various degrees of contributions are taken into account in the two feedback control loops by weighing coefficients Kfp, Kmk according to the operated state of the braking operation member BP. Specifically, in a case where the operation amount corresponding value (that is, the operation amount Bpa and the target pressing force Fpt) is relatively small, the degree of contribution of the feedback control loop for the rotation angle is set larger than the degree of contribution of the feedback control loop for the pressing force. Further, as the operation amount corresponding value (that is, the operation amount Bpa and the target pressing force Fpt) is increased, the degree of contribution of the feedback control loop for the rotation angle is reduced and the degree of contribution of the feedback control loop for the pressing force is increased. These coefficients Kfp, Kmk improves control resolution for the case where the braking operation is small, and ensures control precision for the case where the braking operation is large.

The actual pressing force Fpa acquired by the pressing force acquisition means FPA and the actual rotation angle Mka acquired by the rotation angle acquisition means MKA may include noise. The actual pressing force Fpa and the actual rotation angle Mka are associated, and their relationship is stored in time series order. Further, after the series of braking operation (the operation from when the braking operation is started until it is ended), this correlation is approximated by the polynomial (function) with the second or higher degree. Specifically, the actual rotation angle (detection value) Mka is determined as a function G (Fpa) of the actual pressing force (value after AD conversion) Fpa as in equation (1).

$$Mka = G(Fpa) = a*Fpa^{(n)} + b*Fpa^{(n-1)} + c*Fpa^{(n-2)} + \ldots + d*Fpa + e \qquad \text{Equation (1):}$$

Here, in the equation (1) where $n \geq 2$ and $a \neq 0$ and $e=0$ (that is, the curve where Mka=Fpa=0, and passing through the origin), the coefficients a to d are determined so that the actual rotation angle Mka increases in an "upwardly convex" form as the actual pressing force Fpa increases.

Further, in the equation (1), the target rotation angle Mkt is substituted in the actual rotation angle Mka and the target pressing force Fpt is substituted in the actual pressing force Fpa, by which the calculation map (calculation characteristic) CMkt of the target rotation angle Mkt is created. That is, an equation (2) is set as the calculation map (approximate polynomial) CMkt for calculating the target rotation angle Mkt from the target pressing force Fpt.

$$CMkt = Mkt(Fpt) = a*Fpt^{(n)} + b*Fpt^{(n-1)} + c*Fpt^{(n-2)} + \ldots + d*Fpt + e \qquad \text{Equation (2):}$$

Here, $n \geq 2$ and $a \neq 0$ and $e=0$ (that is, the curve where Mkt=Fpt=0, and passing through the origin) is established.

The target rotation angle Mkt is determined based on the target pressing force Fpt and the calculation map CMkt, and the electric motor MTR is controlled so that the target rotation angle Mkt and the actual rotation angle Mka match. Due to this, the control precision in the small-operation range where the change in the actual pressing force Fpa is small with respect to the change in the braking operation amount Bpa is improved, and the influence of the sensor noises can be compensated without depending on a low pass filter.

In addition, in a case where an analog type sensor is employed as the pressing force acquisition means FPA, the actual pressing force Fpa is affected by the LSB (resolution of the detection signal) in the analog-digital conversion process. Specifically, the actual pressing force Fpa that has been subjected to the AD conversion process exhibits stepwise signal values (detection values). However, since the approximation function is employed as the calculation map CMkt, the step-wise signal values are interpolated, and the influence of the LSB can be compensated.

With the calculation map CMkt approximated by the second or higher degree polynomial, there may be a case where the target rotation angle Mkt does not increase monotonically with respect to the increase in the target pressing force Fpt. Due to this, in the section where the calculation map CMkt is necessary, the calculation map CMkt is set in a monotonically increasing function. Specifically, a condition under which the target rotation angle Mkt is required is the section where the rotation angle compensation electric conduction amount Imk affects the calculation of the composite compensation electric conduction amount Igh (that is, a section where the rotation angle coefficient Kmk is greater than "0"). Thus, the respective coefficients (a, b, etc.) of the approximate polynomial are determined so that the target rotation angle Mkt increases monotonically in the section that is less than the upper value fpu with which the target pressing force Fpt is equal to or greater than "0" and the rotation angle coefficient Kmk is "0" (0≤Fpt<fpu). Since the calculation map CMkt is set as the monotonically increasing function, the target rotation angle Mkt is avoided from decreasing despite the increase in the target pressing force Fpt.

In the embodiments, the configuration with the disk brake using the brake fluid pressure was exemplified. The drum brake may be employed instead of the disk brake. Further, the braking fluid pressure may not be used, and the configuration in which the friction members MSB are pressed against the rotating member KTB directly by the power transmission mechanism DDK may be employed. Same advantageous effects are achieved in this configuration as well.

The invention claimed is:

1. A braking control device for a vehicle, the device comprising:
   an operation amount acquisition means configured to obtain an operation amount of a braking operation member operated by a driver of the vehicle;
   a pressurizing unit configured to press a friction member against a rotating member fixed to a wheel of the vehicle by using an electric motor;
   a control means configured to control an output of the electric motor based on the operation amount;
   a pressing force acquisition means configured to acquire an actual pressing force of the friction member pressing against the rotating member; and
   a rotation angle acquisition means configured to acquire an actual rotation angle of the electric motor,
   wherein the control means is configured to:
   store a correlation between the actual pressing force and the actual rotation angle;
   approximate a function map expressed by a second or higher degree polynomial based on the correlation;
   calculate a target pressing force based on the operation amount;
   control the electric motor by a feedback loop based on pressing force such that the actual pressing force matches the target pressing force;
   calculate a target rotation angle based on the target pressing force and the function map;
   control the electric motor by a feedback loop based on rotation angle such that the actual rotation angle matches the target rotation angle; and
   prohibit the feedback loop based on the rotation angle and only execute the feedback loop based on the pressing force when the target pressing force is above a predetermined upper value.

2. The braking control device for a vehicle according to claim 1, wherein
   the pressing force acquisition means is configured to acquire the actual pressing force through an analog-digital conversion process.

3. The braking control device for a vehicle according to claim 1, wherein the control means is further configured to prohibit the feedback loop based on the pressing force and only execute the feedback loop based on the rotation angle when the target pressing force is below a predetermined lower value which is lower than the predetermined upper value.

4. A braking control device for a vehicle, the device comprising:
   an operation amount acquisition means configured to obtain an operation amount of a braking operation member operated by a driver of the vehicle;
   a pressurizing unit configured to press a friction member against a rotating member fixed to a wheel of the vehicle by using an electric motor;
   a control means configured to control an output of the electric motor based on the operation amount;
   a pressing force acquisition means configured to acquire an actual pressing force of the friction member pressing against the rotating member; and
   a rotation angle acquisition means configured to acquire an actual rotation angle of the electric motor,
   wherein the control means is configured to:
   store a correlation between the actual pressing force and the actual rotation angle;
   approximate a function map expressed by a second or higher degree polynomial based on the correlation;
   calculate a target pressing force based on the operation amount;
   control the electric motor by a feedback loop based on pressing force such that the actual pressing force matches the target pressing force;
   calculate a target rotation angle based on the target pressing force and the function map;
   control the electric motor by a feedback loop based on rotation angle such that the actual rotation angle matches the target rotation angle; and
   prohibit the feedback loop based on the pressing force and only execute the feedback loop based on the rotation angle when the target pressing force is below a predetermined lower value.

5. The braking control device for a vehicle according to claim 4, wherein
   the pressing force acquisition means is configured to acquire the actual pressing force through an analog-digital conversion process.

* * * * *